US010940583B2

(12) United States Patent
Sedlmayr

(10) Patent No.: US 10,940,583 B2
(45) Date of Patent: Mar. 9, 2021

(54) METHOD AND COMPUTER PROGRAM FOR PRODUCING A GRAPHICAL USER INTERFACE OF A MANIPULATOR PROGRAM

(71) Applicant: KUKA Deutschland GmbH, Augsburg (DE)

(72) Inventor: Andreas Sedlmayr, Fürstenfeldbruck (DE)

(73) Assignee: KUKA Deutschland GmbH, Augsburg (DE)

( * ) Notice: Subject to any disclaimer, the term of this patent is extended or adjusted under 35 U.S.C. 154(b) by 317 days.

(21) Appl. No.: 15/775,620

(22) PCT Filed: Nov. 9, 2016

(86) PCT No.: PCT/EP2016/001857
§ 371 (c)(1),
(2) Date: May 11, 2018

(87) PCT Pub. No.: WO2017/080648
PCT Pub. Date: May 18, 2017

(65) Prior Publication Data
US 2018/0370030 A1 Dec. 27, 2018

(30) Foreign Application Priority Data
Nov. 11, 2015 (DE) .................. 102015222164.4

(51) Int. Cl.
*B25J 9/16* (2006.01)
*G05B 19/042* (2006.01)

(52) U.S. Cl.
CPC .......... *B25J 9/1628* (2013.01); *B25J 9/1656* (2013.01); *G05B 19/0426* (2013.01); *G05B 2219/13142* (2013.01); *G05B 2219/23283* (2013.01)

(58) Field of Classification Search
CPC .................. B25J 9/1628; B25J 9/1656; B25J 9/1658–1664; B25J 9/1761;
(Continued)

(56) References Cited

U.S. PATENT DOCUMENTS 4,570,217 A   2/1986  Allen et al.
4,852,047 A * 7/1989  Lavallee .............. G05B 19/058
                                                          700/86
(Continued)

FOREIGN PATENT DOCUMENTS

CN      101048764 A     10/2007
CN      101611373 A     12/2009
(Continued)

OTHER PUBLICATIONS

International Search Report dated Jan. 31, 2017 for PCT Patent Application No. PCT/EP2016/001856.
(Continued)

*Primary Examiner* — Bao Long T Nguyen
(74) *Attorney, Agent, or Firm* — Bachman & LaPointe, P.C.

(57) ABSTRACT

The present invention relates to a computer program for producing a graphical user interface (100) of a manipulator program and to a method for navigation through a manipulator program, wherein the manipulator system (1) controlled by the manipulator program comprises at least one manipulator (30). The manipulator program comprises at least one set-down point (AP1 to AP5). The user interface (100) has a graphical program progress indicator (150) which indicates the current program progress of the manipulator program and the at least one set-down point (AP1 to AP5) of the manipulator program. The at least one set-down point (AP1 to AP5) indicated can be selected by a user, and the manipulator program is set up to control the manipulator (Continued)

system (1) in such a manner that the system assumes a system state assigned to the selected set-down point (AP1 to AP5) in response to the selection. The method comprises the steps of: providing a manipulator program; producing the graphical user interface; stopping the manipulator program; receiving a selection of a set-down point on the program progress indicator of the graphical user interface; and guiding the manipulator program to the selected set-down point, with the result that the manipulator program controls the manipulator system in such a manner that the system assumes the system state assigned to the selected set-down point. Such navigation may be advantageous, in particular, in the field of debugging, error correction and parameter correction or parameter optimization.

19 Claims, 5 Drawing Sheets

(58) Field of Classification Search
CPC ...... G05B 19/0426; G05B 2219/13142; G05B 2219/23283; G05B 19/4069; G05B 19/4155; G05B 19/41835; G05B 19/425; G05B 2219/39453; G05B 2219/40629; G05B 2219/40392; G05B 2219/40393; G05B 2219/40385; G05B 2219/40322; G05B 2219/40108; G05B 2219/40099; G06F 11/36; Y10S 901/03
USPC ............................ 700/264, 22, 23, 27; 901/3
See application file for complete search history.

(56) References Cited

U.S. PATENT DOCUMENTS

| | | | |
|---|---|---|---|
| 5,170,034 A | 12/1992 | Seshimo et al. | |
| 6,108,662 A | 8/2000 | Hoskins et al. | |
| 6,157,864 A | 12/2000 | Schwenke et al. | |
| 6,167,328 A | 12/2000 | Takaoka et al. | |
| 6,243,857 B1* | 6/2001 | Logan, III | G06F 8/34 714/E11.21 |
| 6,289,264 B1 | 9/2001 | Zenke | |
| 6,360,143 B1 | 3/2002 | Yanagita | |
| 9,262,129 B2 | 2/2016 | Santori et al. | |
| 10,504,231 B2 | 12/2019 | Fiala | |
| 2005/0135782 A1* | 6/2005 | Ando | G11B 27/34 386/231 |
| 2008/0165141 A1* | 7/2008 | Christie | G06F 3/0482 345/173 |
| 2008/0201618 A1 | 8/2008 | Pfeiffer et al. | |
| 2009/0198378 A1 | 8/2009 | Boerner et al. | |
| 2011/0288667 A1 | 11/2011 | Noda et al. | |
| 2012/0265338 A1 | 10/2012 | Keibel et al. | |
| 2013/0282177 A1 | 10/2013 | Wiedemann et al. | |
| 2015/0266182 A1 | 9/2015 | Strandberg | |

FOREIGN PATENT DOCUMENTS

| | | |
|---|---|---|
| DE | 102004046611 A1 | 3/2006 |
| EP | 0606649 A2 | 7/1994 |
| EP | 1510894 A1 | 3/2005 |
| EP | 1533671 A1 | 5/2005 |
| EP | 1724676 A1 | 11/2006 |
| EP | 2085846 A2 | 8/2009 |
| EP | 2656980 A2 | 10/2013 |
| WO | 2011125280 A1 | 10/2011 |
| WO | 2017080647 A1 | 5/2017 |
| WO | 2017080650 A1 | 5/2017 |

OTHER PUBLICATIONS

International Search Report dated Feb. 17, 2017 for PCT Patent Application No. PCT/EP2016/001857.
International Search Report dated Feb. 17, 2017 for PCT Patent Application No. PCT/EP2016/001859.
Cosirop 2.0 Programming Software for Mitsubishi Industrial Robots, Dec. 31, 2003, Institute of Robotics Research, Dortmund, Germany.
U.S. Office Action dated Feb. 4, 2020 for U.S. Appl. No. 15/775,614.
International Preliminary Report on Patentability dated May 15, 2018 for PCT Patent Application No. PCT/EP2016/001857.
International Preliminary Report on Patentability dated May 15, 2018 for PCT Patent Application No. PCT/EP2016/001859.
International Preliminary Report on Patentability dated May 15, 2018 for PCT Patent Application No. PCT/EP2016/001856.
Office Action dated Sep. 1, 2020 for U.S. Appl. No. 15/775,619.
Office action dated Oct. 12, 2020 for Chinese Patent Application No. 201680066092.0.

* cited by examiner

US 10,940,583 B2

METHOD AND COMPUTER PROGRAM FOR PRODUCING A GRAPHICAL USER INTERFACE OF A MANIPULATOR PROGRAM

FIELD OF THE INVENTION

The invention relates to a method and a computer program for producing a graphical user interface of a manipulator program which controls a manipulator system. Furthermore, the invention relates to control devices for manipulator systems, which manipulator systems comprise at least one manipulator and are controlled by means of a manipulator program.

BACKGROUND

Manipulator systems typically comprise at least one manipulator which is configured to interact physically with its environment. By way of example, such a manipulator may be an industrial robot which has at least three movable, freely programmable axes and guides an end effector, such as a gripper or a processing tool, for example. Such manipulator systems are used in industrial applications, such as in automobile manufacture, for example.

Manipulator systems are typically controlled by means of a manipulator program which predefines the system behavior in an application-specific manner. The requirements made of the programming of manipulator programs have changed for example owing to the use of new sensor systems that open up new task areas. By way of example, new functionalities can be programmed through the use of force and/or moment sensors, such as are used for example in the industrial robot LBR iiwa from KUKA AG. Said functionalities encompass, inter alia, search passes with sensor systems, force-regulated tool operation, HRC (Human-Robot Cooperation) capabilities and sensitive gripping.

Nowadays manipulator programs are usually programmed using domain-specific programming languages based e.g. on BASIC or PASCAL. A great proportion of programming is debugging and process or parameter optimization, which is effected at the end of the programming of the actual manipulator program. Error detection and correction require considerable resources in terms of time and personnel, thus giving rise to high costs. Furthermore, there is the threat of extensive damage if an error is not detected and leads, e.g. to an interruption of series production.

Customary methods for debugging and error correction typically utilize "jump to line" commands. Said "jump to line" commands are used to reverse code that has already been executed and/or to continue the program at new location. However, in the case of a customary "jump to line" command it is not possible to ensure that the program is continued correctly from the new location since not all essential system parameters can be reset in order to attain a system state corresponding to the system state that would have been present if the program had reached the relevant location as planned.

This can lead for example to undesired movements of a manipulator in the manipulator system. By way of example, a parameter describing the setpoint manipulator speed cannot be reset to a previously valid value. Consequently, following the "jump to line" command the manipulator would move at a different manipulator speed than actually intended.

In order to avoid such errors, debugging backwards in time methods have been developed, which record the execution history of a program, such as of a manipulator program, for instance. Said debugging backwards in time methods make it possible to "rewind" the manipulator program and to continue the manipulator program deterministically since recourse can always be had to previously valid system parameters. The manipulator program thus always behaves as though it had been executed for the first time. However, completely registering and storing the execution history of the manipulator program and hence every past system state necessitates complex sensors and high storage and computation resources. In particular, such sensors detect parameters of the manipulator system. By way of example, cameras, joint angle sensors, force and/or moment sensors, or the like are used.

Besides the stringent hardware requirements, debugging backwards in time methods have complex operating structures, which may possibly give rise to further errors in the programming. It is therefore an object of the present invention to provide navigation through a manipulator program, in particular during program generation by means of a graphical user interface. Such navigation may be advantageous in particular in the field of debugging and parameter correction, or parameter optimization. It is furthermore an object of the present invention at least partly to eliminate the disadvantages mentioned above.

SUMMARY

The object is achieved by means of a computer program as claimed in claim 1, a method as claimed in claim 16, and by means of a control device as claimed in claim 19.

In particular, the object is achieved by means of a computer program comprising instructions for producing a graphical user interface of a manipulator program for controlling a manipulator system, wherein the manipulator system comprises at least one manipulator, wherein the manipulator program comprises at least one rerun point, and wherein the user interface has a graphical program progress indicator, which indicates the current program progress of the manipulator program and the at least one rerun point of the manipulator program, wherein the at least one rerun point indicated is selectable by a user. Furthermore, the manipulator program is configured to control the manipulator system such that the latter assumes a system state assigned to the selected rerun point in response to the selection.

The graphical user interface is typically displayed on a display of the manipulator system. In this case, the display can be a display screen or an input screen, such as a touchscreen, for example.

The manipulator program controls the manipulator system and in particular at least one manipulator. The control can provide for example a defined movement of the manipulator or the gripping of workpieces and the processing of workpieces by means of a manipulator. To that end, the manipulator program preferably comprises a plurality of operations, wherein a rerun point forms the beginning and/or the end of an operation. Preferably, a respective defined system state of the manipulator system is assigned to the rerun points of the manipulator program. The system state is preferably consistent at the rerun points, such that the manipulator program can be continued deterministically from a rerun point. Consequently, an operation that is executed proceeding from a rerun point always leads to the same result independently of the execution history of the manipulator program.

Preferably, a rerun point is linked with at least one further rerun point via at least one operation. The order of the operations from one rerun point to a second rerun point is designated as a path. In this case, the manipulator program can be represented in program code or in higher program models. A representation of the manipulator program in model form is likewise possible. The graphical program progress indicator indicates to the user (independently of the chosen representation of the manipulator program) the extent to which the sequence of the manipulator program has progressed. By way of example, the beginning of a new operation or the successful ending of an operation that has been carried out can be indicated. The rerun points lying between two operations are likewise indicated on the program progress indicator.

If the manipulator program is not yet fully executable, i.e. still contains errors, then programming-dictated errors can occur when running through the program. These errors lead for example to an interruption of the manipulator program. Alternatively, the operator can also interrupt the execution the manipulator program if said operator detects an error. Typical errors are parameterization errors or an incorrect juxtaposition of operations in the sequence of the manipulator program. By way of example, an incorrect movement may be programmed or a parameter threshold of a measurement value may not be set highly enough. Parameter values may likewise be calculated incorrectly or transferred incorrectly. Further errors, for example caused by unforeseen events, or by the response of a safety monitoring system, are likewise possible.

If such an error has occurred and been detected, then a user can select on the program progress indicator a rerun point that precedes the error in the sequence of the manipulator program. In this case, the manipulator program is "rewound", such that it again assumes the parameter values corresponding to the rerun point. Furthermore, the manipulator system is returned to the system state assigned to the selected rerun point. Consequently, renewed execution of the manipulator program from the rerun point is possible afterward, wherein the same results are obtained independently of the execution history of the manipulator program.

Before the renewed start it is possible preferably to rectify detected errors and/or to adapt parameters. Consequently, it is not necessary to terminate and restart the manipulator program in order to rectify an error, rather it can be continued directly from the selected rerun point. Furthermore, it is not necessary to record all system parameters and the complete execution history since defined rerun points provide suitable starting points. Consequently, the system state need only be defined for an assigned rerun point. The path to a selected rerun point from the current location in the sequence of the manipulator program is preferably calculated automatically.

Preferably, a rerun point defines a location in the sequence of the manipulator program to which a system state of the manipulator system is assigned. The assignment of a system state of the manipulator system to a rerun point makes it possible to "rewind" the manipulator program and the manipulator system to the system state from which the manipulator program can be continued.

Preferably, the manipulator program comprises a plurality of operations, wherein the at least one rerun point forms the beginning and/or the end of an operation and preferably the beginning and/or the end of an operation structure. An operation structure preferably comprises a plurality of operations. Preferably, not every operation ends and/or begins at a rerun point. Preferably, a plurality of operations are combined to form an operation structure and these operation structures are linked with one another via rerun points. This makes it possible to define rerun points at those locations in the sequence of the manipulator program whose respectively assigned system state is characteristic of and/or important for the correct implementation of the manipulator program. By way of example, a rerun point can be set after a successful movement of the manipulator along a defined movement path. Processing steps carried out by the manipulator can likewise be bounded by rerun points.

If a plurality of operation structures are executed in succession, then the preceding operation structure in each case is concluded. However, an individual first operation can start a second operation that extends beyond the execution time of the first operation. In this case, the context of the operation structure must be maintained until the last operation of the operation structure has been completely executed. The operation structures thus do not mutually influence one another. Consequently, operation structures executed in parallel lead to the same results as operation structures executed in series. Furthermore, a change in state of an implemented operation structure is permanent.

As described above, the beginning and/or the end of an operation structure can form a rerun point. Proceeding from a rerun point, the manipulator program can be continued independently of its execution history. The same results are always achieved in this case.

Preferably, an operation structure is assigned at least one reaction structure, wherein the at least one reaction structure includes reaction operations upon the execution of which the manipulator program controls the manipulator system such that the latter is guided into a system state corresponding to a rerun point.

If an error then occurs which is based on a programming error or stems from an unforeseen event, such a rerun point can be reached by means of a reaction structure and the manipulator program can be continued from said rerun point. In this case, the rerun point need not correspond to the last rerun point that was passed through. Likewise, a different operation structure than the one in which the error occurred can also be executed by a rerun point. Consequently, a process that has begun can be corrected or continued with a new plan without the manipulator program having to be terminated or restarted.

Furthermore, the direct assignment of operation structure and reaction structure makes possible a clear manipulator program, as a result of which errors in the programming can be reduced. Furthermore, debugging is simplified.

The reaction structure preferably comprises reaction operations which can reverse individual operations if the relevant operation structure describes a reversible process. If the relevant operation structure describes an irreversible process, then the reaction structure can contain reaction operations which enable continuation with a changed plan, i.e. which deviate from a pure cancellation of executed operations.

By way of example, during the placement of a rivet by means of a manipulator, the rivet can become stuck in a hole. Correct riveting is not possible in this case. If the manipulator system detects this error, then the operation structure "riveting" can be terminated and an assigned reaction structure can be initiated. In this example, a possible reaction structure could comprise opening the riveting tool. Afterward, withdrawal of the stuck rivet from the hole could be commanded. Finally, a new rivet could be picked up, and the operation structure "riveting" could be carried out anew.

Further reaction structures are likewise possible. By way of example, depending on the number of failed attempts to execute an operation structure, a reaction structure can command a different procedure. Staying with the previous example, after the repeated iteration of the operation structure "riveting", leading to the same error "stuck rivet", a different procedure could be commanded and an operator could be called. Said operator could be asked to remove the stuck rivet manually.

An operation structure and an assigned reaction structure are preferably implemented in a common semantic module. A fixed assignment of operation structure and reaction structure is thus ensured in the manipulator program, whereby the complexity is reduced.

Besides reversing an operation structure, a reaction structure can also command the termination of the operation structure and/or the continuation of the manipulator program from a different rerun point. Preferably, the system state of the manipulator system at a rerun point and/or before and/or after the execution of an operation structure is not consistent in all system parameters. However, it is necessary to provide consistency in the essential parameters, such that it is possible to continue or repeat the manipulator program proceeding from said rerun point.

Inconsistent system parameters of this type can originate from irreversible processes, for example. By way of example, if a welding process is controlled by means of the manipulator program, then the parameter "weld seam length" is irreversible since, for example, the specific part of the weld seam has already been welded by the time that the error occurs. If an error then occurs, the reaction structure cannot establish the same system state as before the implementation of the welding process. Therefore, in this case, the reaction structure must provide a corresponding reaction operation which makes it possible to rectify the causative error of the welding process (e.g. cleaning of the welding tool) and then continue at the location of the weld seam at which the welding was interrupted. It is likewise possible for the reaction structure in this case to provide an alternative procedure according to which the interrupted weld seam is not intended to be welded to completion, but rather is intended to be reworked in a manual work step. In this case the manipulator program can be continued at a different location.

Preferably, the execution of an operation structure is interrupted upon the occurrence of an error and the execution of a reaction structure is continued afterward. Consequently, an operation structure of the manipulator program can be repeatedly directly after the occurrence of an error or the manipulator program can be continued from a different rerun point. This makes it possible to minimize stoppage times of the manipulator system and to continue preferably in an automated manner, i.e. without intervention by an operator. The productivity of the manipulator system can thus be increased.

Particularly preferably, not every operation of an operation structure is assigned a dedicated reaction operation of a corresponding reaction structure. Likewise, not every operation structure need be assigned a dedicated reaction structure. Preferably, one reaction structure is assigned to one operation structure, wherein the reaction structure is preferably assigned to at least one further operation structure. It is thus possible to react to errors of different operation structures with a reduced number of reaction structures. One reaction structure is preferably assigned to a plurality of operation structures if the operation structures have a common rerun point.

Preferably, the reaction structure includes at least one reaction operation whose execution guides the manipulator system into a system state corresponding to the rerun point, which rerun point forms the beginning of the operation structure in which the error occurred. Such reaction structures make it possible to "rewind" the manipulator system. The operation structure in which the error occurred can thus be repeated. In this case, return to the rerun point need not correspond to a direct inversion of the operation structure, but rather can be executed on an alternative route (path). By way of example, if a movement of a manipulator is intended to be reversed and if the direct return route is blocked, then the manipulator can be returned to the starting point of the movement on an alternative movement path.

Preferably, the at least one reaction operation reverses an operation of the operation structure. Consequently, individual operations can be directly reversed. This is advantageous particularly in the case of reversible processes. In this regard, by way of example, a movement carried out by the manipulator can be directly reversed.

Preferably, an operation of the manipulator program is defined by at least one parameter, wherein the at least one parameter is variable by a reaction operation of the reaction structure. Preferably, the parameter can be adapted by means of the graphical user interface.

A parameter can be a numerical parameter, such as a manipulator speed, for example, or an instruction parameter that influences the sequence of the operations of an operation structure or the selection of the subsequent operation structure. A reaction operation can thus have the effect that the operation structure is continued with altered parameters (e.g. with a slower manipulator speed) or is repeated with altered parameters. It is likewise possible to achieve an alternative branching of the manipulator program.

Preferably, the reaction structure includes at least one reaction operation whose execution continues the interrupted operation structure with at least one changed parameter or executes the interrupted operation structure anew, It is thus possible for operation structures in which an error occurred to be executed anew or, if necessary, with changed, preferably optimized, parameters.

Preferably, the reaction structure includes at least one reaction operation whose execution interrupts the interrupted operation structure until an operator input has been effected, preferably by means of the graphical user interface.

This makes it possible, if the error that occurred cannot automatically be rectified by the manipulator system, to request the intervention of an operator. By way of example, the operator can be asked to check a specific system state, to remove or exchange faulty parts or workpieces from the manipulator system, and/or the like. Once the operator confirms to the manipulator system that the task has been performed successfully, then it is possible to continue with the reaction structure or an operation structure.

Preferably, different reaction operations of the reaction structure are executed, depending on the type of error that has occurred. This is advantageous since it is thus possible to react individually to different types of error. Preferably, different reaction structures are executed depending on the error that has occurred. To that end, an operation structure is preferably assigned a plurality of reaction structures that are executed depending on the error that has occurred.

By way of example, if an operation structure is terminated since a safety mechanism of the manipulator system intervenes, then the operation structure may possibly simply be repeated if the reason for the intervention by the safety facility was a temporary reason. On the other hand, if an error occurs which cannot be rectified in an automated manner, an operator can be called in, who can preferably carry out inputs by means of the graphical user interface in order to rectify an error that has occurred. By way of example, it is possible that an error requires continuation at a different rerun point of the manipulator program. By way of example, an operation structure can be skipped and the manipulator program can be continued at a different location. Consequently, an erroneously executed operation of an operation structure and/or an erroneously executed operation structure can be followed by a corresponding reaction structure of the manipulator program. This enables error-dependent, differentiated debugging and continuation of the manipulator program from a suitable rerun point.

Furthermore, parameters can be changed differently preferably depending on the error that has occurred. By way of example, it is possible to carry out repetition of an operation structure with reduced speed of the manipulator if a first error occurs, or with an altered force threshold of force monitoring of the manipulator if a second error occurs. Other altered parameters are likewise conceivable. Preferably, a rerun point enables the manipulator program to be correctly continued from this location in the sequence of the manipulator program, independently of the execution history of the manipulator program. This ensures that the influence of an error correction or of an optimized parameter value can be considered in isolation. If the error correction or the parameter rectification leads to the desired results in the continuation of the manipulator program, then the procedure can be continued further. If a further iteration loop is necessary for debugging or parameter correction, then it is possible to return to the previous rerun point and to start the manipulator program anew under the same preconditions (e.g. identical parameterization).

Preferably, the computer program is configured to cause the manipulator program to automatically determine a path from a current location in the sequence of the manipulator program to the selected rerun point. If an error occurs in an operation of the manipulator program and said error has been detected, then the program must be rewound to a preceding rerun point before the erroneous operation is carried out anew. This is preferably effected by means of at least one suitable reaction structure. By way of example, a manipulator has to be moved back to the system state corresponding to the selected rerun point. If the computer program can cause the manipulator program to automatically determine a path from a current location in the manipulator program to the selected rerun point, then it is possible rapidly to continue the program or to execute the erroneous operation anew, without the need for intervention by the operator.

Preferably, the computer program is configured, if automatic determining of the path is not possible, to open an input dialogue that enables a path to be ascertained manually. Manually ascertaining a path to a selected rerun point makes it possible to continue the debugging, the rectification of errors or the error correction and parameter optimization without the manipulator program having to be terminated and restarted. Manually ascertaining a path can be effected for example by the selection of suitable operations, operation structures and/or reaction structures which reverse already executed operations or enable an alternative path to a selected rerun point. Likewise, the path can be manually configured by the user bringing the manipulator or the manipulator system to the system state assigned to the selected rerun point, for example by means of a joystick or other input device. Feedback to the operator that indicates or simplifies the attainment of the system state can be indicated by means of the graphical user interface.

Preferably, the graphical user interface comprises at least one model representation of the manipulator program, wherein the program progress and/or the at least one rerun point of the manipulator program and/or a selection of a rerun point of the manipulator program can be indicated on the program progress indicator in the model representation of the manipulator program. The program progress can be indicated for example by a cursor, an arrow or a colored background or the like. In this case, the model representation can be a semantic model, a flow diagram or some other known graphically representable model of a manipulator program.

The rerun points can be represented for example by corresponding highlightings between the individual operations of the manipulator program. A selection of a rerun point of the manipulator program can likewise be identified by a cursor or a colored or graphical highlighting. Other indication methods are likewise possible. The user thus sees the location in the sequence at which the manipulator program is located and, if the user selects a rerun point, which rerun point said user selects. In addition, it is possible to indicate to the user which rerun points are currently selectable, i.e. which rerun points lie before the current location in the sequence of the manipulator program, or which rerun points are attainable via alternative paths.

Preferably, upon navigating through the manipulator program by means of the graphical user interface and in particular by means of the program progress indicator, the current selection of the user at locations of the program progress indicator which correspond to a rerun point is captured in order to simplify the selection of the rerun point. If a user selects a point in the vicinity of a rerun point, for example, then the selection can automatically jump to the corresponding rerun point. Likewise, if the user guides the selection via the program progress indicator, the selection can remain, i.e. be captured, at a rerun point in order to communicate the position of the rerun point to the user and to simplify the selection of the rerun point.

Preferably, the at least one rerun point indicated is assigned a link which can be used to open an input dialog by means of which the manipulator program can be altered. By way of example, upon the occurrence of an error and the selection of a rerun point, it is possible to indicate a parameter list in an input dialogue, which are characteristic the for the operations executed following the rerun point. Consequently, a parameter optimization can be carried out directly. It is likewise possible for an editor to be indicated, which can alter for example the sequence or the order of operations which were carried out following the rerun point. Further changes in the manipulator program may likewise be possible by means of the input dialogue. Consequently, directly after the selection of a rerun point it is possible to change to the error correction mode, which enables errors to be rectified efficiently and rapidly. Likewise, parameters can be optimized rapidly and simply.

Preferably, the graphical user interface comprises at least one graphical representation of the manipulator system which shows the manipulator system in a system state corresponding to the at least one rerun point, wherein the at least one graphical representation is linked to the rerun point indicated. If the actual manipulator system is also represented on the graphical user interface besides a progress of the manipulator program, then it is easier for an operator to select rerun points corresponding to a system state of the manipulator system. The selection of a correct or expedient rerun point is thus simplified. In this case, the graphical representation of the manipulator system can be an actual image of the manipulator system which was created before, during or after the programming of the manipulator program. The graphical representation can likewise be an abstracted representation, such as, for example, a line representation or a representation that was created from a CAD model of the manipulator system.

Preferably, the program progress indicator can furthermore indicate at least one of the following elements:
- a link to further data, wherein further data comprise graphical representations and/or a model representation of the manipulator program;
- a wait and/or synchronization instruction of the manipulator program;
- repetitions and/or branchings of the manipulator program.

Graphical representations and model representations of the manipulator program simplify the assignment of a system state to a selectable rerun point. An indication of wait and/or synchronization instructions of the manipulator program enables the user also to register processes of the manipulator program on the graphical user interface which have no direct effect on the manipulator system. Instructions and operations which do not illicit any change in the system state that can be perceived by the operator can thus be registered by the operator. Consequently, the operator can ascertain at any time whether the manipulator program is still being executed or whether an error is possibly present.

The indication of repetitions and/or branchings of the manipulator program enables a clear representation of a sequence of the manipulator program. By way of example, the manipulator program can branch at a rerun point if different options for continuation exist at the rerun point or at some other point of the manipulator program. By way of example, a manipulator program can provide, if an object was gripped, for said object firstly to be tested, and initiate further steps depending on the test. Said further steps may be for example rework of the object, removal of the object from a production process, or continuation of the processing of the object. The indication of repetitions furthermore makes it possible to indicate recurring elements of the manipulator program in a space-saving manner.

Preferably, the graphical user interface has at least one of the following buttons:
- a button by means of which the manipulator program can be stopped;
- a button by means of which a new rerun point can be defined at a selected location indicated on the program progress indicator and/or by means of which a new path can be defined;
- a button by means of which the manipulator program can be continued from a selected location indicated on the program progress indicator;
- a button by means of which rerun points can be selected which lie between the currently selected location of the program progress indicator and the location at which the stop of the manipulator system was effected;
- a button by means of which individual operations of the manipulator program can be reversed and/or rerun points can be selected, and/or
- a button by means of which rerun points that have already been passed through can be selected.

The buttons mentioned make it possible to navigate through the manipulator program or a model representation of the manipulator program simply and intuitively. The button which triggers a stop of the manipulator program makes it possible to interrupt the manipulator program if the operator detects an error or would like to optimize parameters. The button by means of which new rerun points can be defined makes it possible to register a system state as rerun point which is optimal for specific debugging or parameter optimization. By way of example, it is thus possible to reduce the distance between two adjacent rerun points by defining a new rerun point between two existing rerun points. Consequently, repetitions of operations already running stably can be avoided and time can be saved. The button by means of which the manipulator program can be continued makes it possible, after the interruption and, if appropriate, after the correction of an error, to continue the program. The button for selecting rerun points makes it possible to instigate the "rewinding" of the manipulator program and the return of the manipulator system to a system state corresponding to the selected rerun point. The button by means of which individual operations of the manipulator program are reversed makes it possible to step back independently of rerun points in the sequence of the manipulator program in order for example to be able to directly check the influence of a changed parameter. The button by means of which rerun points that have already been passed through can be selected enables rapid selection of previous rerun points. The essential functions of the computer program can thus be called up directly from the graphical user interface via buttons.

Preferably, the graphical user interface comprises at least one second program progress indicator, which program progress indicator indicates the current program progress of a manipulator program of a second manipulator. This is advantageous particularly if the manipulator system comprises a plurality of manipulators. By way of example, said manipulators can cooperate. If they are driven individually, they can also assume different system states. It is therefore advantageous to indicate the location in the sequence at which the respective manipulator program is located.

Preferably, the program progress indicator is assigned a timescale, wherein the timescale is zoomable. By means of a zoomable timescale, it is possible to indicate a smaller or larger section of the program progress indicator on the display of the manipulator system. Both an overview of the entire manipulator program and details of the manipulator program can thus be indicated. Depending on the type of error to be rectified, it is possible to indicate either an overview, in order for example to alter the order of operations, or details of the manipulator program, in order to optimize parameters.

Preferably, in the program progress indicator, wait times of the manipulator system are indicated on a shortened timescale and even more preferably are cut out. Consequently, the timescale assigned to the program progress indicator need not be linear. Times in the sequence of the manipulator program which do not provide any appreciable information to the user can thus be represented in a compressed manner or even cut out, as a result of which the clarity of relevant information is increased.

Preferably, the program progress indicator is a program progress bar. Program progress bars have the advantage that they can be intuitively grasped rapidly and can give the user rapid feedback about the current program progress.

Preferably, the computer program comprising instructions for producing a graphical user interface is integrated in the manipulator program for controlling a manipulator system. It is likewise possible for the computer program to be a standalone computer program that can be applied to existing manipulator programs.

The object is furthermore achieved by means of a method for navigating through a manipulator program by means of a computer program as described above, wherein the method comprises:

providing a manipulator program;
producing the graphical user interface;
stopping the manipulator program;
receiving a selection of a rerun point on the program progress indicator of the graphical user interface, and
guiding the manipulator program to the selected rerun point, such that the manipulator program controls the manipulator system such that the latter assumes the system state assigned to the selected rerun point.

The method makes it possible, by means of a graphical user interface, to stop a manipulator program if an error has been detected. The manipulator program can likewise be stopped if for example a breakpoint is set for debugging. A breakpoint stipulates a location in the sequence of the manipulator program at which the manipulator program is intended to be stopped or interrupted in order for example to monitor or to optimize parameters or the like. Once the manipulator program has stopped, then changes can be made to the manipulator program. Said changes can comprise the adaptation of parameters and/or the change of an order and/or the addition of operations of the manipulator program and/or the like. Receiving a rerun point on the program progress indicator of the graphical user interface makes it possible to head for a selected rerun point or to establish a system state of the manipulator system which corresponds to the rerun point. The manipulator program can thus be "rewound", wherein the manipulator system assumes a system state corresponding to the rerun point. The manipulator program can subsequently be continued proceeding from the rerun point.

Preferably, the method furthermore comprises automatically determining a path from a current location in the sequence of the manipulator program to the selected rerun point and, if automatic determining is not possible, opening an input dialog that enables a path to be ascertained manually. This ensures that the selected rerun point can be reached. This can be effected either automatically or else by intervention by an operator, as described above.

Preferably, in the course of guiding the manipulator program to the selected rerun point, it is possible to wait for an interaction of an operator with the manipulator system, and an interaction is preferably displayed for an operator. It may be possible, for example, that an error that occurs cannot be automatically rectified by the manipulator system. By way of example, in a manufacturing process, a component may become stuck or a defective component may be present. If the manipulator system cannot automatically remove these components from the production cycle, for example, intervention by the operator may be necessary. In this case, the method described can react to this error case such that an operator is called in, who rectifies the error. Preferably, the manipulator system or the graphical user interface indicates to the operator what error has been detected and/or how the error can be rectified. Consequently, even if a rerun point cannot be reached automatically, said rerun point can be reached after intervention by the operator, without the manipulator program having to be started anew.

The object is furthermore achieved by means of a control device for a manipulator system comprising a computer program as described above, wherein the graphical user interface is preferably produced on a hand-held display device, such as a tablet computer and/or a smartphone. A control device for a manipulator system is typically assigned to the manipulator system and serves for controlling the manipulator system. Such control devices can themselves comprise a display on which the graphical user interface can be displayed. Such displays can be for example touchscreens or the like. It is likewise possible for the control device to display the graphical user display additionally or exclusively on a further display device. Display devices are known and can be for example tablet computers or smartphones. This is advantageous since tablet computers and smartphones are available in large numbers and can be procured at a favorable price.

BRIEF DESCRIPTION OF THE DRAWINGS

The invention is described below by means of the appended figures. In this case.

DETAILED DESCRIPTION

Figure 1:
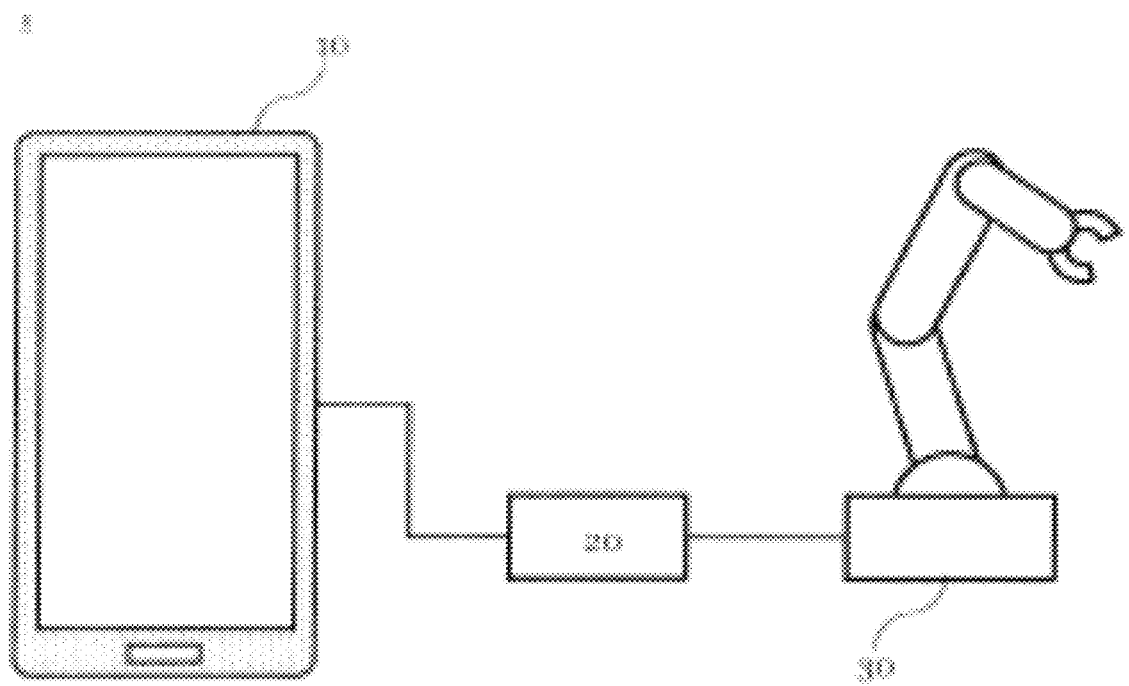
FIG. 1 shows a schematic illustration of a manipulator system.

In particular, FIG. 1 shows a manipulator system 1 comprising a manipulator 30, a control device 20 and also a display device 10. The manipulator 30 can be an industrial robot, for example. The display device 10 can be integrated into the control device 20 or can be embodied as a separate device. By way of example, the display device 10 can be a tablet computer or a smartphone that communicates with the control device 20 of the manipulator system 1 in a wired or wireless manner. A computer program for producing a graphical user interface of a manipulator program can be installed on the display device 10 and/or on the control device 20. The computer program can likewise be integrated into an existing manipulator program.

Figure 2:
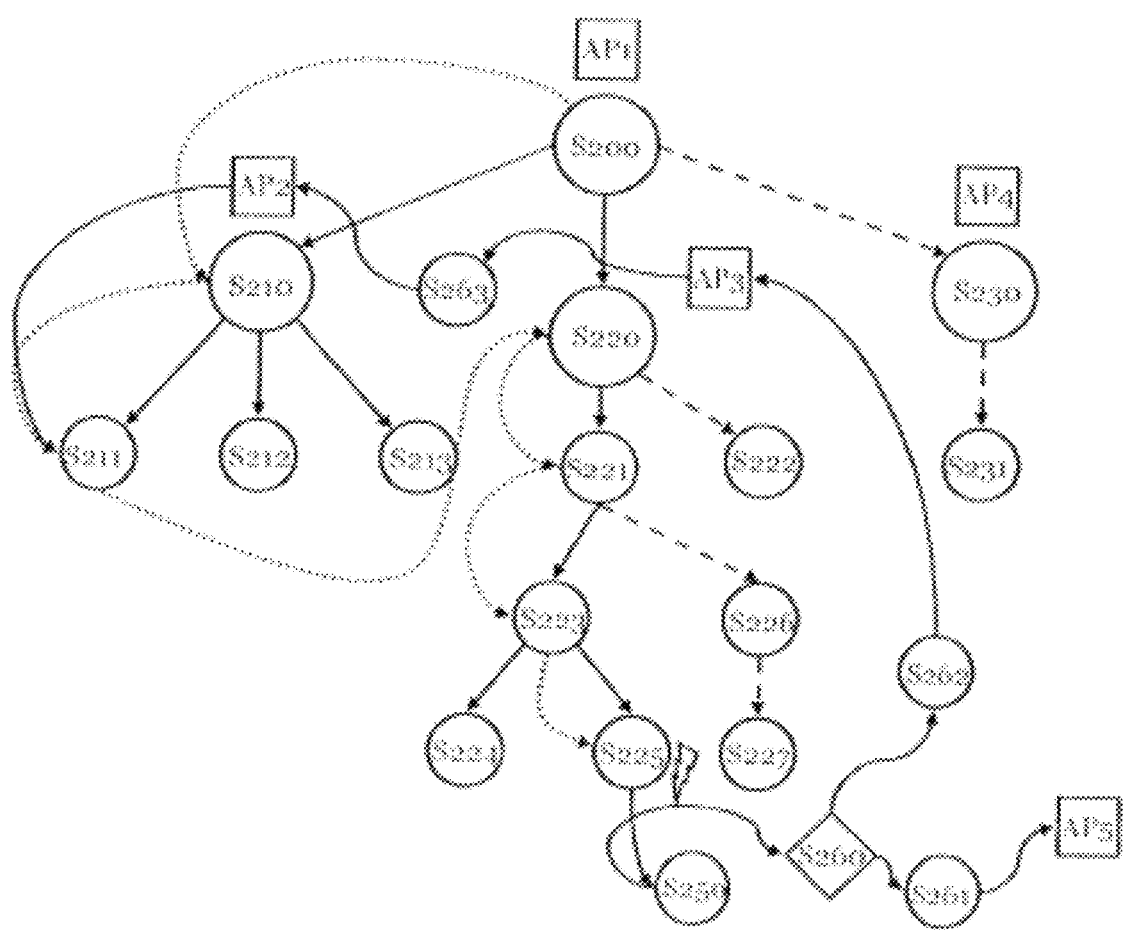
FIG. 2 shows a schematic model representation of a manipulator program.

FIG. 2 shows a graphical representation of a manipulator program 2. The graphical representation of the manipulator program comprises operations S200 to S261, which are represented by circles. The individual operations are linked with one another via the solid arrows. The operations of the manipulator program can be executed successively or else include branchings. Individual operations are assigned rerun points AP1 to AP5 (represented in squares). At said rerun points AP1 to AP5 the system state of the manipulator system is consistent in each case, that is to say that, proceeding from the rerun point, operations lead to the same result, independently of the execution history of the manipulator program. The arrows illustrated in a dotted manner indicate a possible sequence of the manipulator program. Beginning at rerun point AP1, firstly of the operation S200 is executed. The sequence then continues with operations S210 and S211 to arrive at operation S220. Proceeding from operation S220, which is assigned the rerun point AP3, operations S221, S222, S223 and S225 are executed. An error occurs in operation S225, as is illustrated by a flash of lightening.

The manipulator program is thus interrupted in operation S225. rerun point AP2 is then selected by an operator, for example, in order to continue the manipulator program 2. The computer program assigned to the manipulator program 2 can then automatically determine a path to rerun point 2 and cause corresponding operations to be executed by the manipulator program. To that end, firstly operation S250 is executed. In S260, in order to be able to arrive at rerun point AP2, operation S262 must be chosen as the next operation. This operation leads to the rerun point AP3. The rerun point AP3 is linked with rerun point AP2 via the path defined via operation S263. It is thus possible automatically to return from the erroneous operation S225 to the rerun point AP2. The manipulator system, in accordance with the operations, once again assumes the system state assigned to the rerun point AP2.

In addition, debugging can be carried out, such that upon the renewed execution of the manipulator program beginning from AP2 the manipulator program can be continued without having to be interrupted in operation S225. Afterward it is possible to continue with operations S250, S260 and S261, for example, in order to arrive at rerun point AP5.

Figure 3:
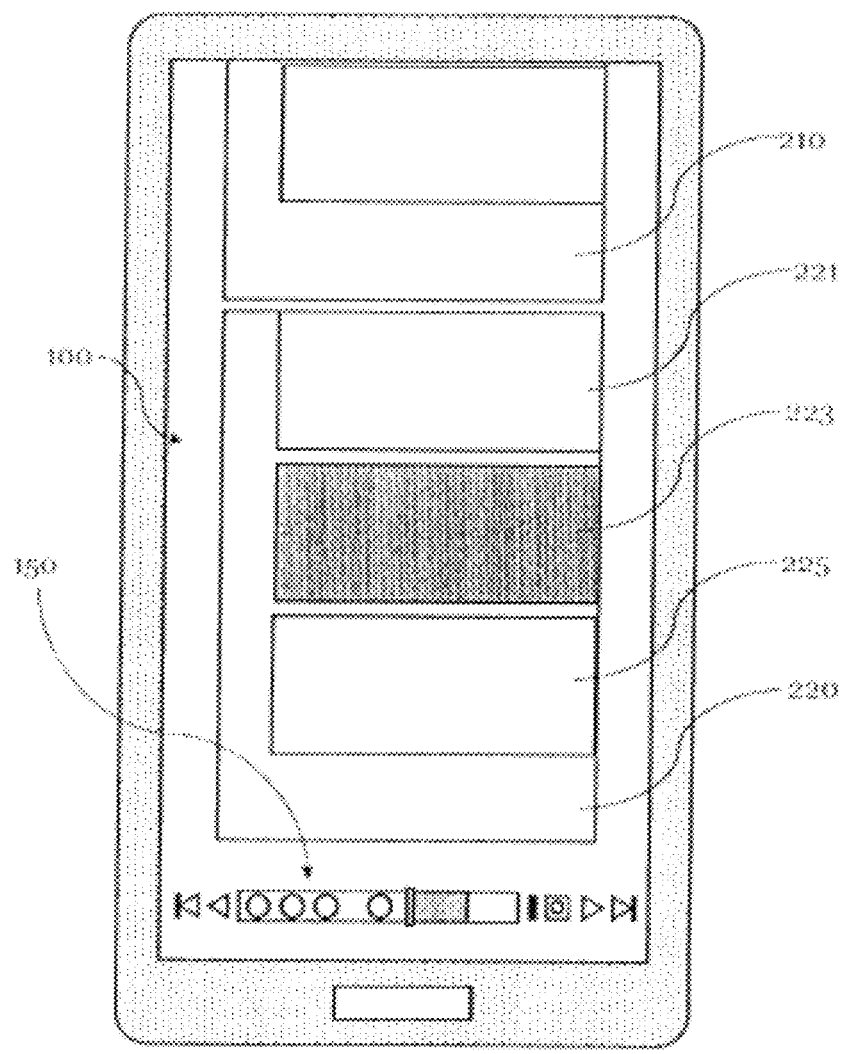
FIG. 3 shows a schematic illustration of a display device comprising a graphical user interface.

FIG. 3 shows a graphical display device 10, which is for example a smartphone or a tablet computer. The display device can likewise be integrated into a control device of the manipulator system. The graphical user interface 100 is displayed on the display device 210. The graphical user interface 100 comprises a program progress indicator 150, which is illustrated in the form of a program progress bar. The program progress bar 150 is a time bar, for example, which uses a cursor to indicate the location in the sequence of the manipulator program at which the manipulator program is currently located.

Block structures 210 to 225 are displayed on a further part of the graphical user interface 100. Said block structures 210 to 225 are a model representation of the manipulator program. In this regard, an operation corresponding to operation S210 is represented by means of block 210, for example. Correspondingly, an operation corresponding to operation S220 from FIG. 2 is represented by means of block 220. Block 220 comprises further subordinate blocks corresponding to operations S221, S223 and S225. Operations S224, S226 and S227, which are not currently being executed in the sequence of the manipulator program, are omitted in the model representation chosen. The clarity can thus be increased.

Besides the program progress bar 150, the current program progress can also be represented in the model representation for example by the colored background of the current block. By way of example, block 223 corresponding to operation S223 here exhibits a colored background. This indicates to the operator that the manipulator program is currently in operation S223.

Figure 4:
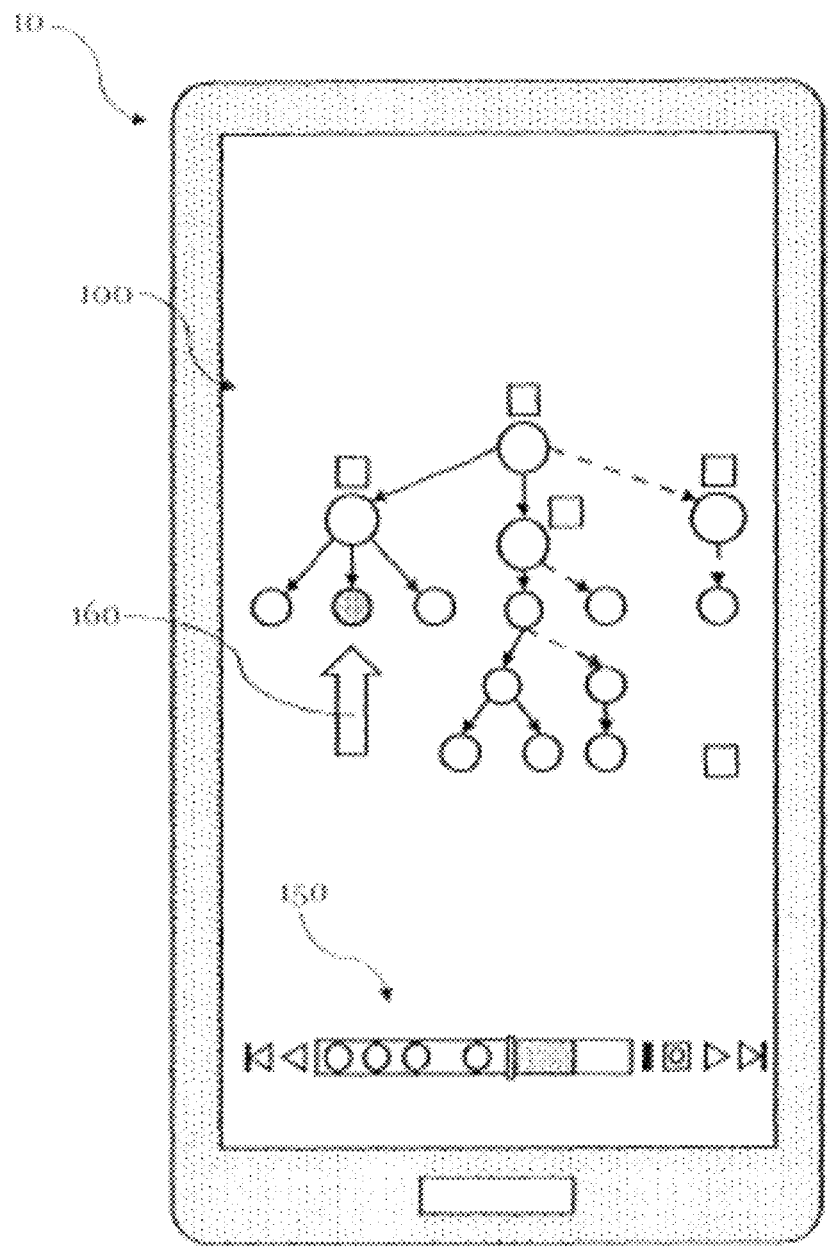
FIG. 4 shows a schematic illustration of a display device, comprising a further graphical user interface.

FIG. 4 shows a further form of the model representation of the manipulator program on the graphical user interface. Besides the program progress indicator 150, a graphical model or the like can also be displayed on the graphical user interface 100. By way of example, the graphical model of the manipulator program already known from FIG. 2 can be displayed. This enables a clear representation of all possible branchings of the manipulator program. In this case, operations are represented for example as circles, and rerun points as rectangles. The operation of the manipulator program that is currently being executed is highlighted by a corresponding background. In addition, an arrow or a cursor 160 can point to the current program progress.

Figure 5:
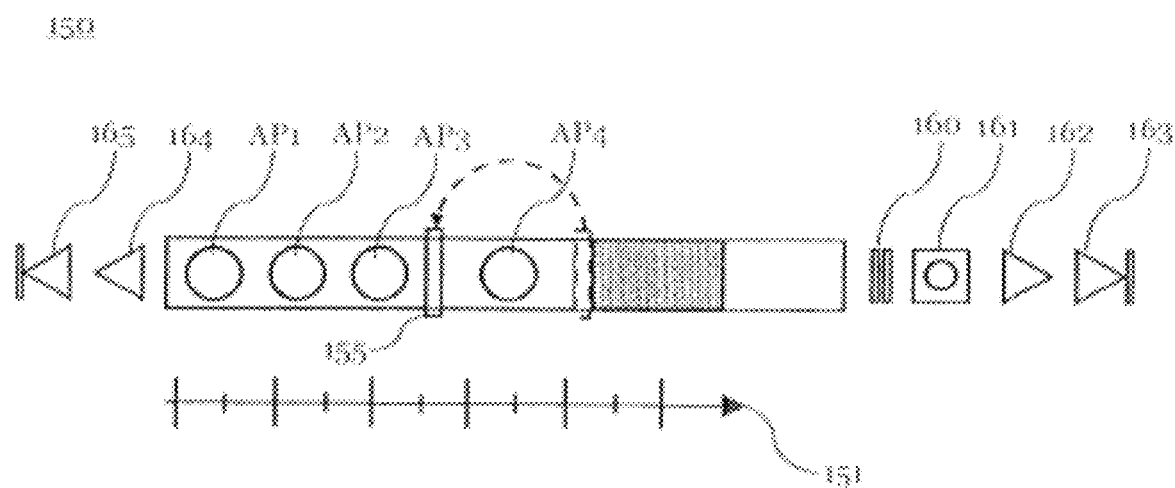
FIG. 5 shows a schematic illustration of a program progress indicator.

The program progress indicator 150 is illustrated in detail in FIG. 5. A timescale 151 is assigned to the program progress indicator 150. Furthermore, a sequence of rerun points AP1 to AP4 is represented on the program progress indicator. The cursor 155 indicates the location in the sequence of the manipulator program at which the manipulator program is located. By way of example, if an error occurs after rerun point AP4 (dashed illustration of the cursor 155), then the program can be returned to rerun point AP3. To that end, the cursor is dragged to the corresponding location in the program progress bar and the corresponding rerun point is selected. Alternatively, a rerun point can also be selected directly. The buttons 160-165 enable the graphical user interface to be operated in a simple manner. By way of example, the manipulator program can be interrupted by means of button 160. Button 161 makes it possible to define a rerun point at the current location in the sequence of the manipulator program and/or to define a new path. Button 162 allows the program to be continued, while button 163 instigates jumping to a rerun point lying after the current location in the sequence of the manipulator program. Individual operations of the manipulator program can be reversed by means of button 164. Button 165 allows direct jumping back to previous rerun points.

LIST OF REFERENCE SIGNS

1 Manipulator system
10 Graphical display device
20 Control device
30 Manipulator
AP1-AP5 rerun points
S200-S261 Operations
100 Graphical user interface
210-225 Blocks of a block representation of the manipulator program
150 Program progress indicator
160 Arrow/Cursor
151 Timescale
155 Cursor
160 to 165 Buttons

What is claimed is:

1. A manipulator system comprising:
   at least one manipulator (30);
   a control device (20) running a computer program comprising instructions for producing a graphical user interface (100) of a manipulator program for controlling the manipulator system, wherein:
      the manipulator program comprises at least one rerun point (AP1 to AP5);
      the user interface (100) has:
         a graphical program progress indicator (150), which indicates current program progress of the manipulator program and the at least one rerun point (AP1 to AP5) of the manipulator program;
      the at least one rerun point (AP1 to AP5) indicated is selectable by a user;
      the manipulator program is configured to control the manipulator system such that the latter assumes a system state assigned to the selected rerun point (AP1 to AP5) in response to the selection;
      the computer program is configured to cause the manipulator program to automatically determine a path from a current location in a sequence of the manipulator program to the selected rerun point (AP1 to AP5); and
      the computer program is configured, if automatic determining is not possible, to open an input dialogue that enables the path to be ascertained manually.

2. The manipulator system as claimed in claim 1, wherein each said at least one rerun point (AP1 to AP5) defines a corresponding location in the sequence of the manipulator program to which the assigned system state of the manipulator system is assigned.

3. The manipulator system as claimed in claim 1, wherein the manipulator program comprises a plurality of operations (O1 to On), wherein the at least one rerun point (AP1 to AP5) forms the beginning and/or the end of an operation of the plurality of operations (O1 to On).

4. The manipulator system as claimed claim 1, wherein each said at least one rerun point (AP1 to AP5) enables the correct continuation of the manipulator program from an associated location in the sequence of the manipulator program, independently of the execution history of the manipulator program.

5. The manipulator system as claimed in claim 1, wherein the graphical user interface (100) comprises at least one model representation (2) of the manipulator program, wherein
the program progress and/or
the at least one rerun point (AP1 to AP5) of the manipulator program
and/or a selection of a rerun point (AP1 to AP5) of the manipulator program can be indicated on the program progress indicator (150) in the model representation (2) of the manipulator program.

6. The manipulator system as claimed in claim 1, wherein the at least one rerun point (AP1 to AP5) indicated is assigned a link which can be used to open an input dialog by means of which the manipulator program can be altered.

7. The manipulator system as claimed in claim 1, wherein the graphical user interface (100) comprises at least one graphical representation of the manipulator system which shows the manipulator system in the system state corresponding to the at least one rerun point (AP1 to AP5), wherein the at least one graphical representation is linked to the rerun point (AP1 to AP5) indicated.

8. The manipulator system as claimed in claim 1, wherein the program progress indicator (150) can furthermore indicate at least one of the following elements:
a link to further data, wherein further data comprise graphical representations and/or a model representation of the manipulator program;
a wait and/or synchronization instruction of the manipulator program;
repetitions and/or branchings of the manipulator program.

9. The manipulator system as claimed in claim 1, wherein the graphical user interface (100) has at least one of the following buttons:
a button (160) by means of which the manipulator program can be stopped;
a button (161) by means of which a new rerun point can be defined at a selected location indicated on the program progress indicator and/or by means of which a new path can be defined;
a button (162) by means of which the manipulator program can be continued from a selected location indicated on the program progress indicator;
a button (163) by means of which rerun points can be selected which lie between the currently selected location of the program progress indicator and the location at which a stop of the manipulator system was effected;
a button (164) by means of which individual operations of the manipulator program can be reversed and/or rerun points of the at least one rerun point (AP1 to AP5) can be selected, and/or
a button (165) by means of which rerun points that have already been passed through can be selected.

10. The manipulator system as claimed in claim 1, wherein the graphical user interface (100) comprises at least one second program progress indicator, which program progress indicator indicates the current program progress of at least one second manipulator program of at least one second manipulator.

11. The manipulator system as claimed in claim 1, wherein the program progress indicator (150) is assigned a timescale (151), wherein the timescale (151) is zoomable.

12. The manipulator system as claimed in claim 1, wherein the program progress indicator (150) indicates wait times of the manipulator system on a shortened timescale.

13. The manipulator system as claimed in claim 1, wherein the program progress indicator (150) is a program progress bar.

14. A method for operating the manipulator system as claimed in claim 1, wherein the method comprises:
providing the manipulator program;
producing the graphical user interface (100);
stopping the manipulator program;
receiving the selection of the selected rerun point (AP1 to AP5) on the program progress indicator (150) of the graphical user interface, and
guiding the manipulator program to the selected rerun point (AP1 to AP5), such that the manipulator program controls the manipulator system (1) such that the latter assumes the system state assigned to the selected rerun point (AP1 to AP5).

15. The method as claimed in claim 14, further comprising:
automatically determining the path from a current location in the sequence of the manipulator program to the selected rerun point (AP1 to AP5) and, if automatic determining is not possible,
opening an input dialog that enables the path to be ascertained manually.

16. The method as claimed in claim 14, wherein in the course of guiding the manipulator program to the selected rerun point (AP1 to AP5), it is possible to wait for an interaction of an operator with the manipulator system, and the interaction is displayed for the operator.

17. The manipulator system as claimed in claim 1, wherein the graphical user interface (100) is produced on a hand-held display device (10).

18. A method for navigating through a manipulator program by means of a computer program comprising instructions for producing a graphical user interface (100) of a manipulator program for controlling a manipulator system (1), wherein:
the manipulator system (1) comprises at least one manipulator (30);
the manipulator program comprises at least one rerun point (AP1 to AP5)
the user interface (100) has:
a graphical program progress indicator (150), which indicates a current program progress of the manipulator program and the at least one rerun point (AP1 to AP5) of the manipulator program;
the at least one rerun point (AP1 to AP5) indicated is selectable by a user; and
the manipulator program is configured to control the manipulator system (1) such that the latter assumes a system state assigned to the selected rerun point (AP1 to AP5) in response to the selection,
the method comprises:
providing the manipulator program;
producing the graphical user interface (100);

stopping the manipulator program;

receiving the selection of the selected rerun point (AP1 to AP5) on the program progress indicator (150) of the graphical user interface;

guiding the manipulator program to the selected rerun point (AP1 to AP5), such that the manipulator program controls the manipulator system (1) such that the latter assumes the system state assigned to the selected rerun point (AP1 to AP5); and automatically determining a path from a current location in a sequence of the manipulator program to the selected rerun point (AP1 to AP5) and, if automatic determining is not possible, opening an input dialog that enables the path to be ascertained manually.

19. The method as claimed in claim 18, wherein in the course of guiding the manipulator program to the selected rerun point (AP1 to AP5), it is possible to wait for an interaction of an operator with the manipulator system (1), and the interaction is displayed for the operator.

* * * * *